(No Model.) 4 Sheets—Sheet 1.

T. TRIPP.
VALVE FOR LOCOMOTIVES.

No. 400,374. Patented Mar. 26, 1889.

WITNESSES:
Walter L. Perry
James A. Woodbury.

INVENTOR.
Thomas Tripp.
BY
E. Frank Woodbury.
ATTORNEY.

(No Model.) 4 Sheets—Sheet 2.

T. TRIPP.
VALVE FOR LOCOMOTIVES.

No. 400,374. Patented Mar. 26, 1889.

WITNESSES:
Walter L. Perry.
James A. Woodbury

INVENTOR.
Thomas Tripp.
BY
E. Frank Woodbury.
ATTORNEY.

(No Model.) 4 Sheets—Sheet 3.
T. TRIPP.
VALVE FOR LOCOMOTIVES.

No. 400,374. Patented Mar. 26, 1889.

WITNESSES:
Walter L. Perry
James A. Woodbury

INVENTOR.
Thomas Tripp.
BY E. Frank Woodbury.
ATTORNEY.

(No Model.)  T. TRIPP.  4 Sheets—Sheet 4.
VALVE FOR LOCOMOTIVES.

No. 400,374.  Patented Mar. 26, 1889.

WITNESSES:
Walter L. Perry
James A. Woodbury

INVENTOR.
Thomas Tripp
BY
E. Frank Woodbury
ATTORNEY.

UNITED STATES PATENT OFFICE.

THOMAS TRIPP, OF AVON, ASSIGNOR TO THE TRIPP ANTI-FRICTION JOURNAL BEARING COMPANY, OF BOSTON, MASSACHUSETTS.

VALVE FOR LOCOMOTIVES.

SPECIFICATION forming part of Letters Patent No. 400,374, dated March 26, 1889.

Application filed May 3, 1888. Serial No. 272,701. (No model.)

*To all whom it may concern:*

Be it known that I, THOMAS TRIPP, of Avon, in the county of Norfolk and State of Massachusetts, have invented certain new and useful Improvements in Valves for Locomotives, of which the following, taken in connection with the accompanying drawings, is a specification.

My invention relates to steam-engines especially of the locomotive class and of the reversing type; and it has for its object the relieving of the steam-cylinders of such engines of excessive pressures, when piston-valves are used, in a manner equally as efficient as when the ordinary D slide-valve is used.

It also has for its object, in addition to its qualified efficience, the use of mechanical devices designed to be theoretically and mechanically correct—that is to say, devices that are of simple, durable, and mechanical construction, and that in use are efficient and economical, and that are readily and cheaply manufactured and easily applied.

Figure 1:
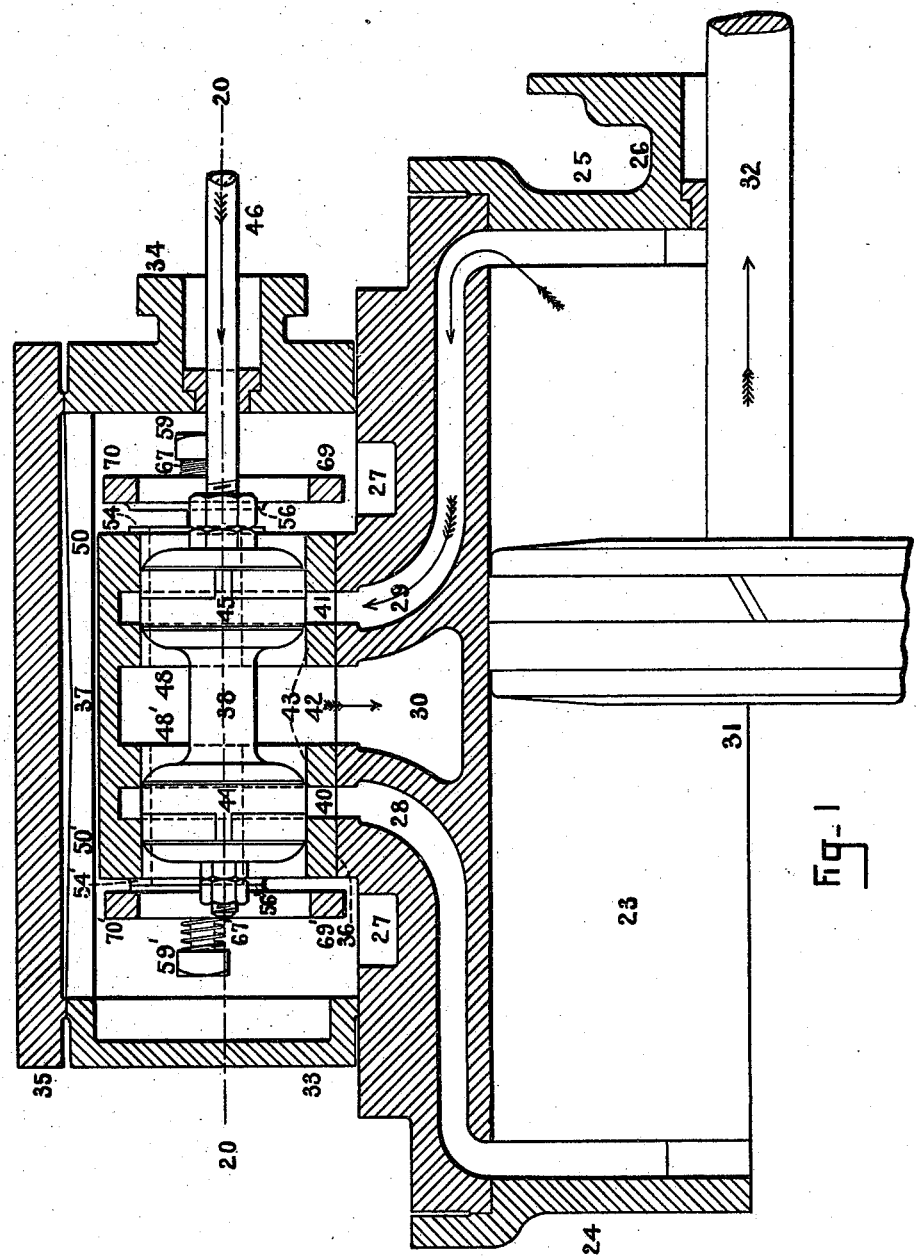
Figure 2:
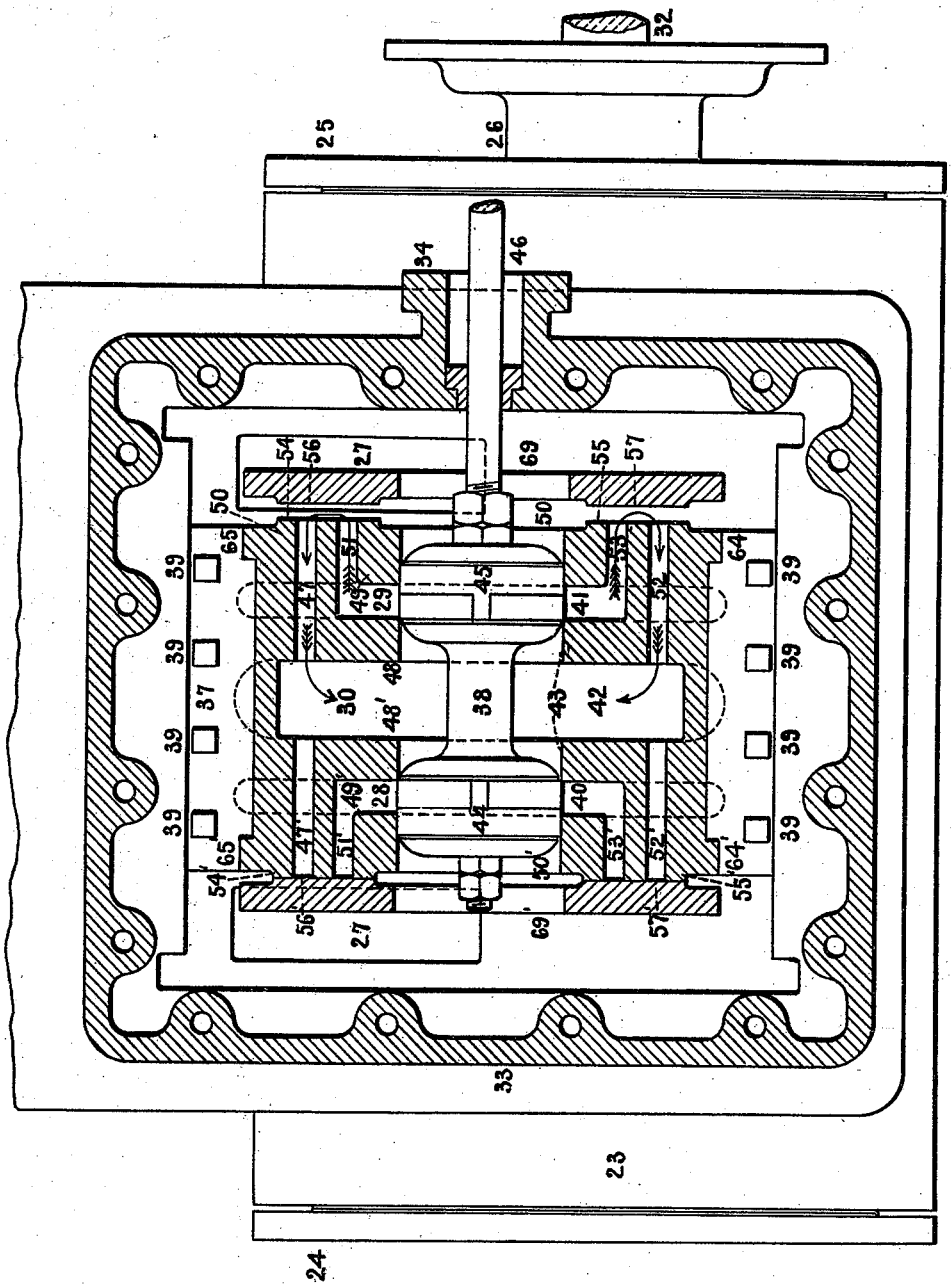
Figure 3:
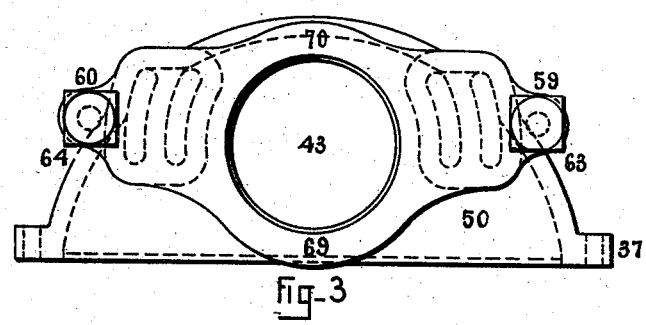
Figure 4:
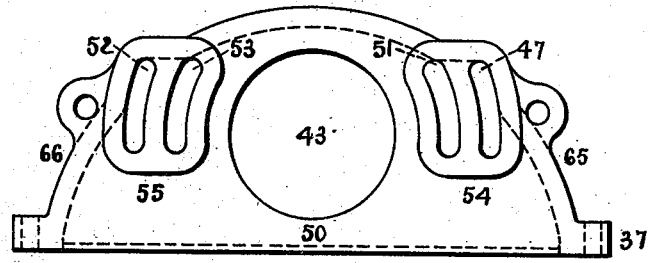
Figure 5:
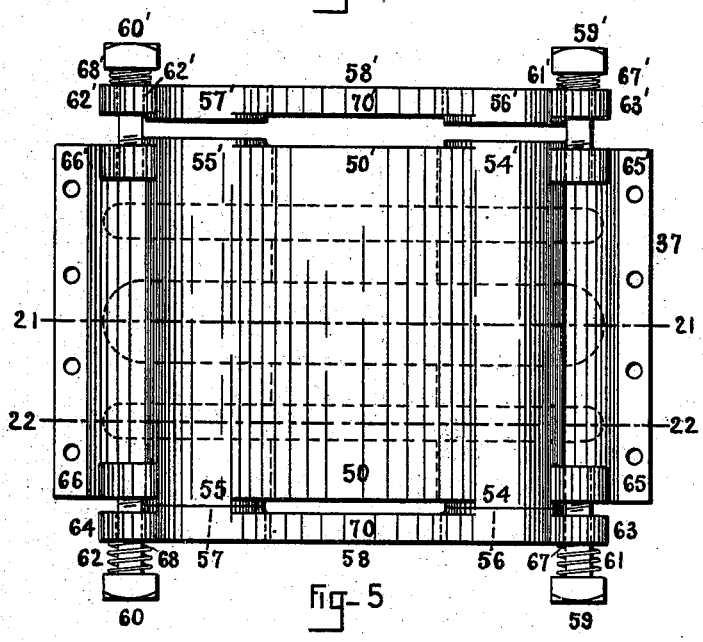
Figure 6:
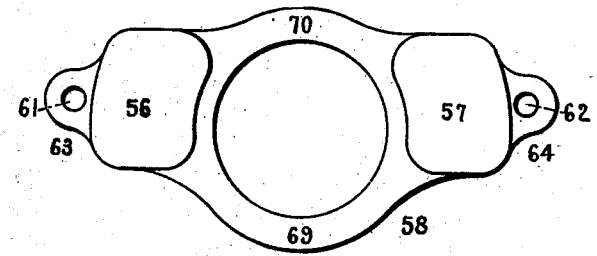
Figure 7:
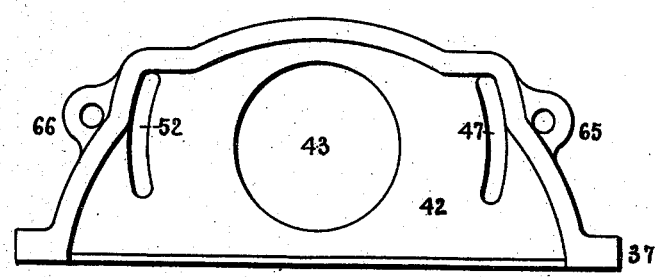
Figure 8:
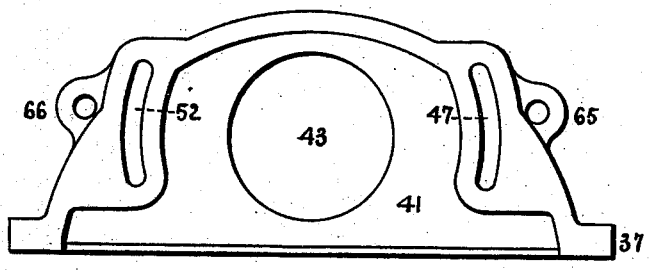

Figure 1 represents my devices in central vertical section as applied to a locomotive-cylinder provided with a piston-valve, the steam-chest, valve-cylinder, and cylinder being represented in central vertical section and the piston valve and rod and piston and rod being represented in side elevation. Fig. 2 is a full sectional view of Fig. 1 on line 20 20, except that the piston valve and rod are represented in plan. Fig. 3 is an end view of piston-valve cylinder. Fig. 4 is an end view of piston-valve cylinder with puppet-plate removed. Fig. 5 is a plan of piston-valve cylinder. Fig. 6 is a rear elevation of puppet-plate 58. Fig. 7 is a vertical sectional view of Fig. 5 on line 21 21. Fig. 8 is a vertical sectional view of Fig. 5 on line 22 22.

The following are parts of an ordinary locomotive-cylinder designed to be provided with the usual D slide-valve: Steam-cylinder 23, provided with heads 24 and 25, head 25 being provided with the stuffing-box 26, inlet-ports 27 27, supply-ports 28 and 29, exhaust-port 30, piston 31, piston-rod 32, steam-chest 33, provided with stuffing-box 34 and cover 35, and valve-seat 36. These parts are made of the usual material, and are bolted or otherwise secured together in the usual manner.

Instead of using an ordinary D slide-valve upon the valve-seat 36, the valve-cylinder 37 and piston-valve 38 are used.

The valve-cylinder 37, the bottom area of which is equal to and is the same form of the valve-seat 36, to which it is bolted by means of bolts 39, is constructed as follows: It is provided with the supply-ports 40 and 41, exhaust-port 42, and cylindrical bore 43, to which is fitted the piston-valve 38, which is provided with the heads 44 and 45, and which has fitted to it the valve-rod 46. This construction and arrangement of valve-cylinder and piston-valve are of the common form and arrangement, and are designed to operate in the usual well-known manner.

The valve-cylinder is provided with the following additional ports, which are constructed within the valve-cylinder, as follows: The port 47 extends from the exhaust-port 42 through partition 48, supply-port 41, and partition 49, to the end portion, 50, of the valve-cylinder, and the port 51 extends from supply-port 41 through partition 49 to the end portion, 50, of the valve-cylinder. In a like manner the port 52 extends from the exhaust-port 42, through partition 48, supply-port 41, and partition 49, to the end portion, 50, of the valve-cylinder, and the port 53 extends from supply-port 41 through partition 49 to the end portion, 50, of the valve-cylinder. The end portion, 50, of the valve-cylinder, where the ports 47 and 51 and ports 52 and 53 end, are provided with the seats 54 and 55, respectively. These seats are covered in a manner similar to valves and their seats by the puppet-plate seats 56 and 57, respectively. The puppet-plate 58, provided with the seats 56 and 57, is held in its position of oppositeness to the seats 54 and 55 by means of bolts 59 and 60, which pass, respectively, through the enlarged holes 61 and 62 of the puppet-plate ears 63 and 64, and are securely screwed into the ears 65 and 66 of the valve-cylinder. The plate is guided in its lift or travel by means of the bolts 59 and 60, which serve as guides, and the plate is held in its position of contact by means of pressure exerted by means of the spiral springs 67 and 68, which are placed between the bolt-heads and ears of the plate. The seat portions of the plate 58 are annularly united by means of the portions 69 and 70.

The construction of the valve-cylinder and the arrangement of its ports is the same for both ends. Therefore the end portion, 50', of the valve-cylinder is provided with the following ports and parts in duplicate, as follows: Port 47', partitions 48' and 49', ports 51', 52', and 53', seats 54' and 55', plate-seats 56' and 57', puppet-plate 58', bolts 59' and 60', enlarged holes 61' and 62', plate-ears 63' and 64', valve-cylinder ears 65' and 66', spiral springs 67' and 68', and portions 69' and 70'.

Excessive pressures are produced in cylinders by many well known and understood causes, and, for the purpose of illustrating the operation of my invention, I have assumed to exist, in Figs. 1 and 2, excessive pressure-producing conditions due to causes to be hereinafter set forth. It is assumed that a locomotive running ahead under a full head of steam is provided with the cylinder 23, and that at about the time the piston 31 commences its stroke ahead the piston-valve is reversed. Then the piston, when it reaches a position in the cylinder, as shown, moving toward the front head in the direction as indicated by an arrow, may have produced an excessive pressure within the cylinder between the front head and the piston when the piston has reached a position of its stroke, as shown in drawings, or during the completion of its stroke toward the front head. This excessive pressure, which should be relieved, and which could not be relieved by the piston-valve, for the reason that the piston-valve head 45 covers the supply-port 41, and as the piston-valve is moving in the direction as indicated by an arrow, Fig. 1, the supply-port 41 might not be uncovered by the piston-valve head 45 until the excessive pressure produced, unless relieved, may have caused disastrous effects, such as the breakage of the front cylinder-head. In such an event, whenever the pressure is slightly greater within the space between the piston and the front head and the ports 29 and 41 than the pressure in the steam-chest, the puppet-plate 58 would be forced from the end portion, 50, of the valve-cylinder, thereby uncovering and connecting the ports 47 and 51 and the ports 52 and 53, and thereby permitting the full escape of the compressed gases through the supply-ports 29 and 41 to the exhaust-port 42, by means of the ports 51 and 47 on one side of the valve-cylinder, and on the other side by means of ports 53 and 52, all as indicated by arrows in Figs. 1 and 2.

It is obvious that whenever and for whatever cause the pressure within the supply-port 41 is slightly greater than the pressure within the steam-chest, such pressure would be permitted to freely escape through the ports 47, 51, 52, and 53 to the exhaust-port 42, which port is always in open connection with the atmosphere.

A modification of the ports, which is objectionable on account of the necessary length of the ports, causes increased cylinder-clearance, which objectionable feature may be offset by advantages, such as accessibility of parts and the use of but one puppet-plate. The modification is as follows: The ports 47' and 52', leading from the exhaust-port 42 to the end portion, 50', of the valve-cylinder, may be omitted, and the ports 51' and 53', instead of extending from the port 40 to the end portion, 50', may extend from the port 40 to the end portion, 50, and be so arranged as to be covered by the puppet-plate 58, in which case the puppet-plate would perform the duty that would be performed by both puppet-plates if the ports were constructed and arranged as illustrated in the drawings.

What I claim as new, and desire to secure by Letters Patent, is—

1. A valve-cylinder provided with the interiorly-constructed ports extending from its supply port or ports to its exhaust-port, the connection between said supply-ports and exhaust-port being controlled by the puppet-plate devices, substantially as described.

2. The valve-cylinder 37, provided with ports 40, 41, and 42, 47, 51, 52, 53, 47', 51', 52', and 53', in combination with the puppet-plates 58 and 58', operatively constructed and arranged substantially as and for the purposes set forth.

In testimony whereof I have signed my name to this specification, in the presence of two subscribing witnesses, on this 1st day of May, A. D. 1888.

THOMAS TRIPP.

Witnesses:
E. FRANK WOODBURY,
J. L. BAILEY.